W. S. RIGGS.
Cultivator.
No. 738, 31,742.
Patented Mar. 19, 1861.
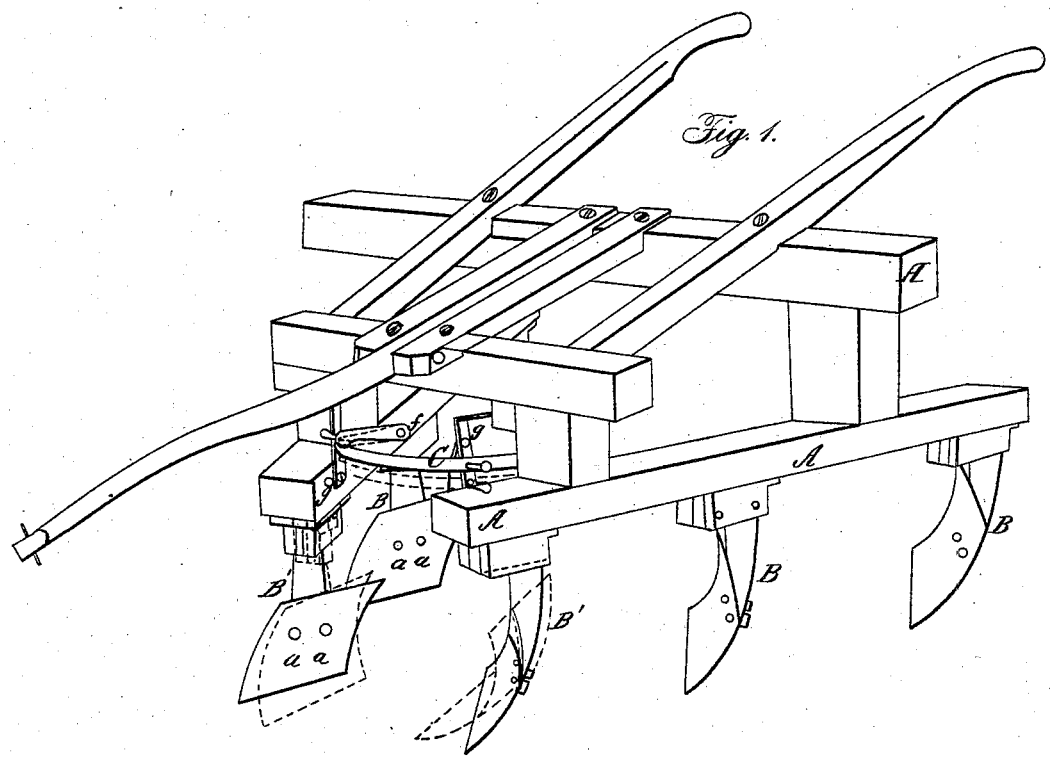
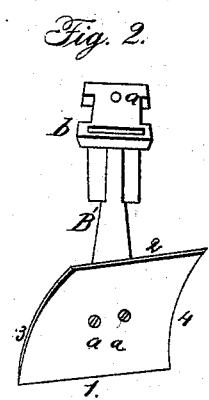
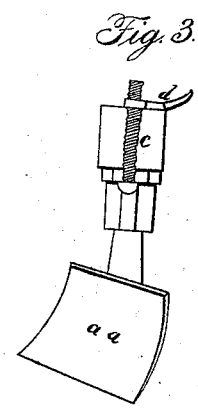
Witnesses:
George B Riggs
Ezekiel C Chamberlin

UNITED STATES PATENT OFFICE.

WILLIAM S. RIGGS, OF HIGHTSTOWN, NEW JERSEY.

IMPROVEMENT IN CULTIVATORS.

Specification forming part of Letters Patent No. 31,742, dated March 19, 1861.

*To all whom it may concern:*

Be it known that I, WILLIAM S. RIGGS, of Hightstown, New Jersey, have invented certain new useful and Improvements in Cultivators; and I do hereby declare that the following is a full, clear, and exact description thereof, and of its construction and mode or manner of operation, reference being had to the accompanying drawings, and to the letters of reference marked thereon, making a part of this specification.

Figure 1 is a general view of a cultivator having my improvements. Figs. 2 and 3 illustrate different methods of attaching the share-standard to the frame.

The general nature of my improvements consist in so constructing the cultivator, according to the arrangement hereinafter described, that the inclination of some of the shares to the row or drill of the plants can be changed, so that the shares will pass through the soil without making any furrow, or can be made to throw a furrow, as desired.

Fig. 1 shows a cultivator constructed generally as ordinary ones, having a suitable frame-work, A, and with corresponding series or pairs B B of standards and shares $a\ a$, the number of which may be varied at pleasure.

In cultivators as generally constructed heretofore the plows have been firmly fixed to the frame, and when used when the plants are young there is much danger or liability of danger that the plants themselves would be disturbed and injured by means of the closeness of the forward plows to each other and their inclination to the row of plants. If, on the other hand, the plows are placed far enough apart to prevent such liability of danger, the ground would not be sufficiently stirred and loosened. This defect I remedy and prevent by so connecting the forward plows, B' B', to the frame that they can be moved sidewise, and their inclination to the planted row changed, so that they will merely pass through the ground, loosening it without throwing it into a furrow, or so that they will cast up a furrow when desired. The effect or result of this arrangement is that the forward series or pair of plows can be made to pass quite near the plants without disturbing them, but at the same time loosening the soil, when the plants are young and not firmly rooted; but when the plants become strongly rooted the same plows can be so placed as to throw a furrow toward the row of plants. Such change in position is obtained by fastening the standard to the frame, so that it can have sidewise motion on the fulcrum $a$, Fig. 2, and is held in any position by a screw passing through the slot $b$, the length of which slot governs the side motion or swing of the plow; or, more conveniently, a screw-bolt, $c$, (Fig. 3,) may pass up through the ends of the frame, through a slot, and is held and fixed in any position by the hand-nut $d$. By loosening this nut $d$ the plow may be moved sidewise on the fulcrum $a$, and its consequent inclination to the planted row varied.

In Fig. 1, the heavy lines show the different series of plows having their shares generally parallel with each other, and so fixed as to cause them to throw up a furrow as they move. The dotted lines in same figure represent the forward plows, B' B', so turned as to have less inclination toward the planted row, so that they will pass through the soil without throwing it in a furrow and merely loosening it.

The shares, or, what may be termed the "mold-boards," $a\ a$, are cast or made so that their opposite sides 1 2 are alike, and they have the same angle with the upright sides 3 4. When, therefore, the side 1 is so much worn as to impair or lessen the efficient operation of the cultivator, the pieces $a\ a$ may be changed, so as to bring the edge or surface 2 into use. To enable this change easily to be made, the shares $a\ a$ are fastened to the standards B B by screw-bolts, or in any equivalent manner. The shares $a\ a$ have thus two cutting or operating surfaces, and they thus last much longer.

To the front part of the frame is attached the draw-bar C, which has motion on its point of attachment $f$. From the frame also extend upright bars $g\ g$, which have also motion on their points of attachment or connection, and having a number of holes in them, as represented in the drawings, so that the bar C can be fixed in different positions or at different heights.

When, for any reason, it is desired to have the cultivator take a deeper furrow, the draw-bar C is to be elevated; and when, on the other hand, the furrow is to be shallower, the bar C should be lowered.

What I claim as my invention, and desire to secure by Letters Patent, is—

The arrangement, substantially as set forth, of the standards B B' and shares $a\,a$, and frame A, the whole operating as and for the purposes set forth and described.

WM. S. RIGGS.

Witnesses:
GEORGE B. RIGGS,
EZEKIEL C. CHAMBERLIN.